United States Patent
Braudeau et al.

[11] 4,032,741
[45] June 28, 1977

[54] REAMING DEVICE FOR MACHINING BY ELECTRO-EROSION

[75] Inventors: Pierre Braudeau, Paris; Alfred Marié Aime Maillet, Versailles, both of France

[73] Assignee: Carel Fouche Languepin, Paris, France

[22] Filed: Apr. 1, 1976

[21] Appl. No.: 672,615

Related U.S. Application Data

[63] Continuation-in-part of Ser. No. 546,885, Feb. 4, 1975, abandoned.

[30] Foreign Application Priority Data

Feb. 13, 1974 France .............................. 74.04869

[52] U.S. Cl. ................ 219/69 V; 74/117; 719/69 E
[51] Int. Cl.² .................................. B23P 1/08
[58] Field of Search ............ 219/69 V, 69 E, 69 M, 219/69 R, 69 G; 318/39; 74/117, 69

[56] References Cited
UNITED STATES PATENTS

| | | | |
|---|---|---|---|
| 1,187,849 | 6/1916 | Landis | 74/117 |
| 1,198,662 | 9/1916 | Reece | 74/117 |
| 3,433,919 | 3/1969 | Braudeau et al. | 219/69 V |
| 3,584,721 | 6/1971 | Lawrence | 74/117 |
| 3,663,786 | 5/1972 | O'Connol | 219/69 V |
| 3,739,135 | 6/1973 | Pfau et al. | 219/696 |
| 3,777,595 | 12/1973 | Haustamann | 219/69 V |

*Primary Examiner*—Bruce A. Reynolds
*Attorney, Agent, or Firm*—Young & Thompson

[57] ABSTRACT

The electrode-holder of an electro-erosion machine is displaced at right angles to the direction of feed and to the same extent in a plurality of uniformly distributed directions by means of a reaming device placed between the machining-head spindle and the electrode-holder. A mechanism placed laterally with respect to the spindle and secured thereto imparts circular translational motion to a member comprising a plate which supports the electrode-holder.

4 Claims, 7 Drawing Figures

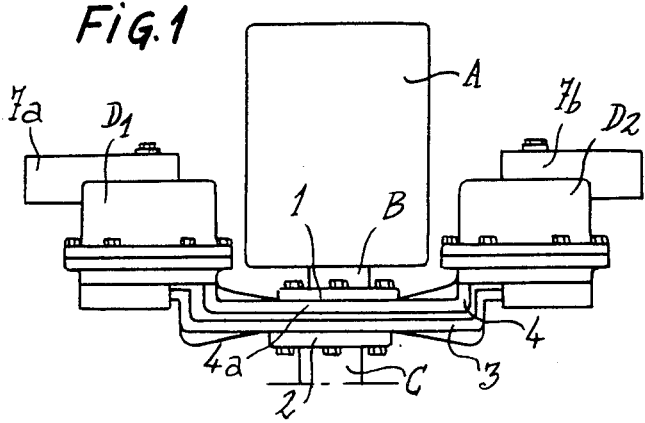
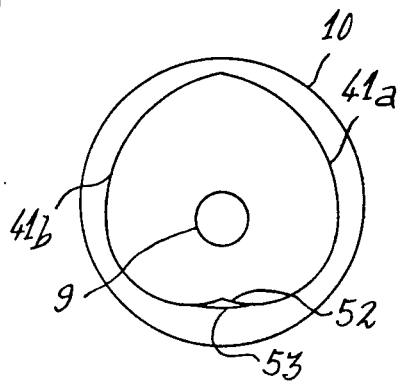
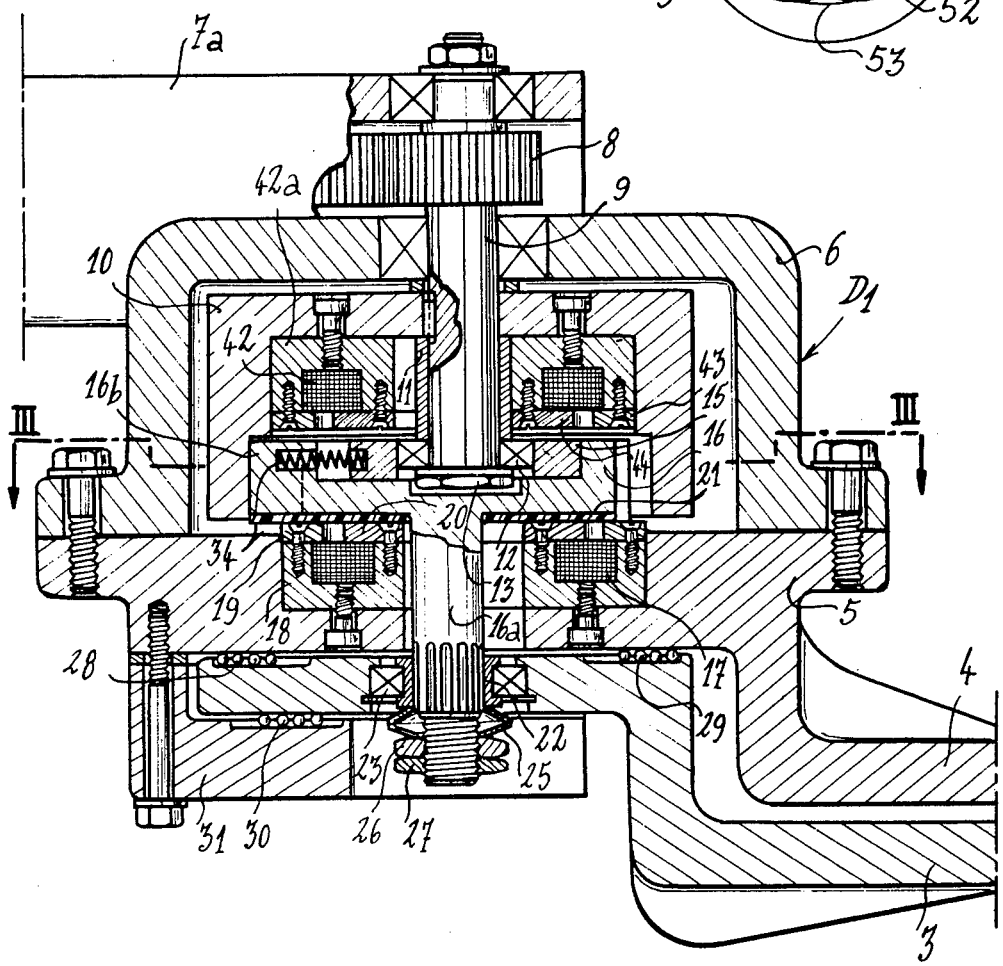

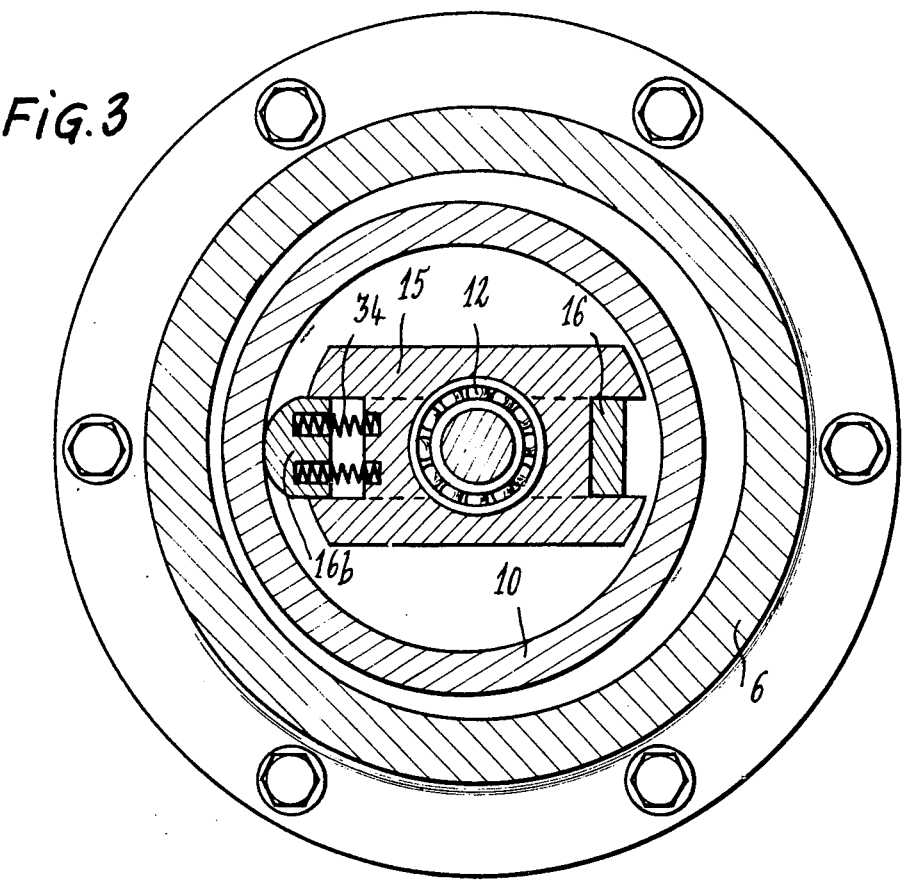
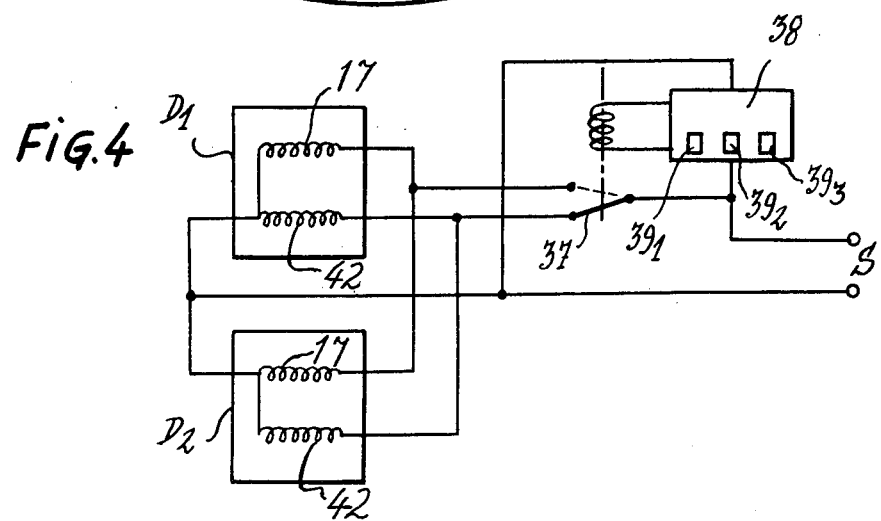
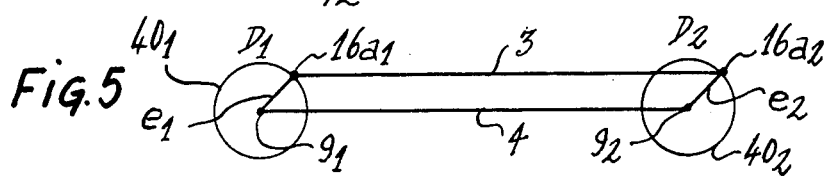

REAMING DEVICE FOR MACHINING BY ELECTRO-EROSION

This is a continuation-in-part application of our co-pending application Ser. No. 546,885 filed on Feb. 4, 1975, abandoned.

This invention relates to a reaming device for use in electro-erosion machining operations.

In their U.S. Pat. No. 3,433,919, the present Applicants described a method of machining by electro-erosion which, in order to dispense with tooling electrodes having progressively larger sizes from the initial rough-forming to the finishing of a workpiece, accordingly makes use of a single electrode, said electrode and said workpiece being moved relative to each other, at right angles to the direction of feed and relatively displaced to the same extent in a large number of directions uniformly distributed about said direction of feed.

In particular, in order to ensure that these successive relative displacements of the electrode can be carried out conveniently from a central position in all the directions of the plane, it has been proposed in the patent cited above to impart to the electrode and to the workpiece a relative orbital or circular translational movement, the radius of which corresponds to the desired extent of displacement.

Typically, said relative movement can be obtained by moving the electrode, the workpiece remaining stationary. Alternatively, the electrode can be submitted to the one feed movement, the orbital movement being imparted to the workpiece.

To this end, it has been proposed to employ various devices usually known as "reaming heads" which are interposed in a vertical direction between the machining head (which governs the feed of the electrode) and the electrode-holder.

This arrangement is subject to disadvantages in that the height of units for machining by electro-erosion is increased by the height of the reaming head and that conversely, known reaming heads cannot be adapted to existing machines.

It is an object of the invention to overcome these disadvantages.

According to the invention, the reaming device to impart a reciprocal orbital movement, along a lateral circular translational motion of adjustable radius of curvature, to two respective members comprising an electrode mounted on a spindle of a machining head of an electrical erosion machine and a workpiece electrically machined by said electrode, one of said both members being moved and the other remaining stationary, comprises at least two separate mechanisms, each having mechanical means therein for imparting an orbital movement to a driven part thereof, one at least of said mechanisms being energized by a rotative motor and comprising a frame rigidly secured to a fixed part of said machine, means being provided for synchronizing the respective motors of said mechanisms and for setting them in a same orientation if more than one mechanism is provided with such a motor, and said device further comprises means linking said driven parts to each other, said linking means comprising a rigid plate acting as a coupling crank relative to said driven parts, said crank being rigidly secured onto that of said members which is to be moved, said rotative motors being free from any mechanical linkage between each other, thereby permitting said mechanisms to be located remote from each other.

The device according to the invention accordingly permits the interposition of only one plate which can be of small thickness between the electrode-holder and the spindle of the machining head.

The device preferably comprises two similar mechanisms which are oriented in like manner and disposed symmetrically with respect to the spindle of the machining head whilst the plate can be considered as a flat crank which provides a coupling between these two mechanisms.

In a particular form of execution of the invention and in order to facilitate the attachment of the mechanisms for producing reciprocal circular translational motion to the spindle of the machining head relative to the workpiece, the frames of said mechanisms are rigidly fixed to a second plate which is mounted against the face of said spindle in the usual position of attachment of the electrode-holder.

There is thus only the thickness of the two plates between said spindle and said electrode-holder, which does not modify the usual overall height of the machine to any appreciable extent, that is to say the sum of the heights of the machining head, of the electrode-holder and of the electrode.

The structural design is thereby improved from the point of view of overall size, strength and rigidity.

The mechanisms for producing circular translational motion are preferably of the type comprising an eccentric pivotally mounted within a circular bearing of a moving member which is prevented from moving in rotation. The result just mentioned is obtained automatically by means of two mechanisms which are kinematically identical and connected to each other by a plate forming a coupling crank.

In an advantageous form of construction, an eccentric having a value of eccentricity which can be varied comprises two ferromagnetic members which are capable of sliding in radial motion with respect to each other and can be locked in position by means of an electromagnet.

In order to adjust the degree of eccentricity, the two members aforesaid can be urged elastically in the direction of inreased displacement off-center and the value of eccentricity can be varied by means of an eccentric cam which limits the relative displacement of these members and momentarily limits them from the locking action of the electromagnet. 16, A measurement with a comparator applied to one point of the plate which is capable of circular translational motion males it possible to check the value of eccentricity obtained.

It will be noted that, as disclosed in the cited patent to the present Applicants, it is known to form a reaming head with two identical and parallel mechanisms of the eccentric type and coupled together by means of a crank which carries the electrode. In this case, however, the assembly is interposed between the machining head and the tooling electrode as in the other known forms of construction of reaming heads and the result sought in the present invention is consequently not achieved.

It must further be noted that said reciprocal movement can be obtained either by moving the electrode along said orbital movement, the workpiece remaining stationary, or by moving the workpiece, the electrode being only submitted to its feed motion towards the workpiece.

The manner in which this invention can be carried into effect will be clearly understood by reference to the accompanying drawings, in which:

FIG. 1 is a general view of a reaming device according to a first embodiment the invention;

FIG. 2 is an enlarged axial sectional view of one of the mechanisms for producing circular translational motion;

FIG. 3 is a sectional view taken along line III—III of FIG. 2;

FIG. 4 is a simplified diagram of control of eccentricity in the device illustrated in FIGS. 2 and 3;

FIG. 5 is a highly diagrammatic representation of a device according to the invention and permits simplification of the description;

FIG. 6 is a bottom view of an alternative form of construction of a drum;

Figure 7:
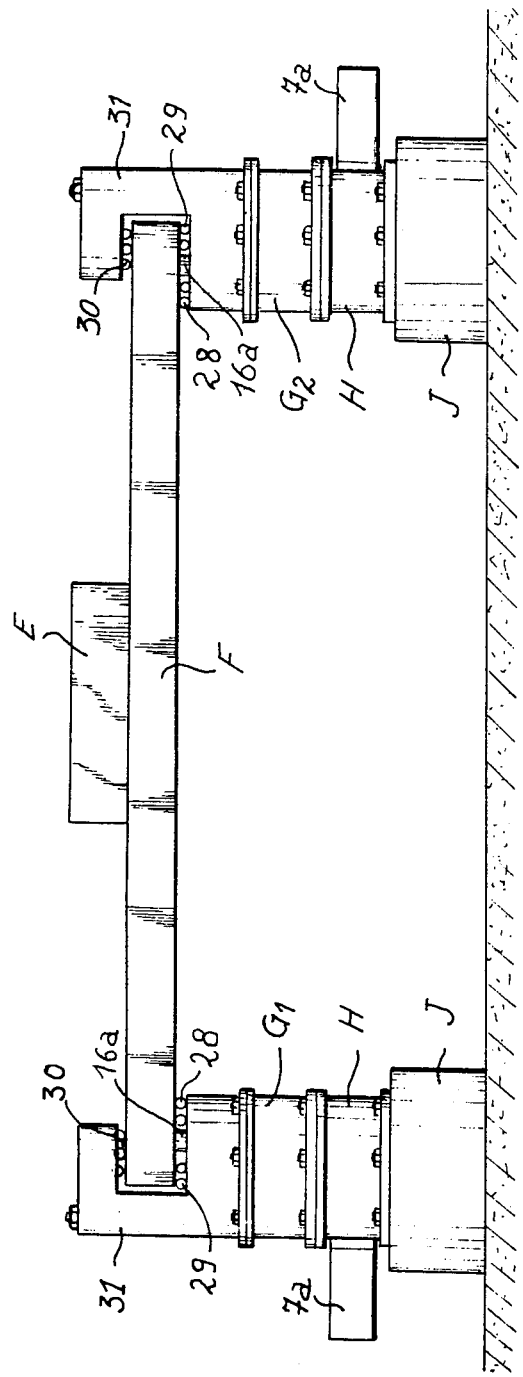
FIG. 7 is a general view of a reaming device according to an alternative embodiment of the invention.

In FIG. 1, a machining head A which is designed to carry out the feed motion of the machining spindle B according to the progression of the electro-erosion process is normally coupled to an electrode-holder C by means of flanges 1 and 2.

The usual reaming heads have to be placed in position between the coupling flanges 1 and 2, thus increasing the height of the assembly.

In order to overcome this disadvantage, provision is made in the form of construction shown in FIG. 1 for two parallel mechanisms $D_1$ and $D_2$ which are of identical size and serve to produce circular translational motion. Said mechanisms are coupled together by means of a flat crank 3 and their frames comprise a common portion 4 which is in the form of a plate in its central portion 4a.

Said central portion 4a is secured to the coupling flange 1 and the flat crank 3 is secured to the coupling flange 2.

Thus it is clear that the axis of the electrode-holder is capable of carrying out an orbital movement with respect to the axis of the machining spindle B since the crank 3 to which said electrode-holder is rigidly fixed performs such a movement with respect to the frames of the two mechanisms $D_1$ and $D_2$ which are rigidly fixed to said spindle.

The two mechanisms are preferably symmetrical with respect to the head A as illustrated. This condition is not imperative although it does offer an advantage from the point of view of convenience.

Moreover, the mechanisms $D_1$ and $D_2$ could be secured directly to the spindle B and laterally with respect to this latter. However, the arrangement which is illustrated deserves preference since these mechanisms can accordingly be mounted without any need to modify existing spindles and heads while making use of coupling flanges 1 and 2 which are conventional in this type of machine.

The mechanisms $D_1$ and $D_2$ can be of any suitable type. Each mechanism constitutes with respect to the other a means for ensuring constant orientation of the member which is driven in circular translational motion, namely the flat crank 3 in this example.

As a preferable feature, these mechanisms are of the type comprising an eccentric having a variable degree of eccentricity and pivotally mounted in a circular bearing of the member which is driven in circular translational motion.

In order to vary the degree of eccentricity or displacement off-center of the eccentrics, it is possible to adopt the procedure mentioned in the patent cited in the foregoing, that is to say to adjust these eccentrics by means of micrometer screws.

One advantageous arrangement of eccentric mechanisms of this type is illustrated in FIGS. 2 and 3 and offers the advantage of automatic variation of eccentricity.

The casing of said mechanism comprises a bottom element 5 which is rigidly fixed to the common portion of frame 4 and a cover 6.

Moreover, in the case of the mechanism $D_1$, said cover supports a reduction-gear motor 7a which drives a pinion 8, said pinion being rigidly fixed to a shaft 9 which is rotatably mounted within the casing.

There is keyed on the shaft 9 a drum 10 which can be cylindrical but slightly displaced off-center and maintained axially by means of a spacing sleeve 11, a ball bearing 12 and a nut 13.

There is fixed within the drum 10 an upper electromagnet comprising a winding 42, an annular casing 42a and annular pole-pieces 43 and 44.

The bearing 12 is engaged within a guide 15 having the general shape of an H, in the hollow end-portions of which are engaged the extremities of a slide-block 16 having a generally C-shaped cross-section which is integral with a pivot 16a. Springs 34 which are applied against the guide continuously tend to thrust the slide-block back into the position illustrated in FIG. 3, that is to say to maintain the rounded extremity 16b of the slide-block in contact with the internal wall of the eccentric drum 10.

The top faces of the slide-block 16 and of the guide 15 which are both of ferromagnetic metal lie in the same plane, with the result that these two parts can both be engaged at the same time with the pole-pieces of the top electromagent.

There is fixed within the portion 5 of the casing a bottom electromagnet which is similar in design to the top electromagnet just described and accordingly comprises a winding 17, an electromagnet casing 18 and pole-pieces 19 and 20.

That face of the slide-block 16 which is directed towards the bottom electromagnet lies in the same plane as the corresponding guide face but is covered by a non-magnetic plate of antifriction material 21 whilst the guide 15 is not provided with a plate of this type. Thus the energization of the bottom electromagnet has the effect of locking the guide in position while permitting the displacement of the slide-block.

The lower end of the pivot 16a is splined and engaged in a ring 22 of corresponding section, said ring being mounted at the center of a ball-bearing 23 and this latter being fixed within an opening of the plate 3 which is countercranked at its extremities.

When the machine is not in service, the slide-block tends to be applied against the pole-pieces of the bottom electromagnet by the axially elastic ring 25, said ring being compressed by a nut and a lock-nut 26, 27 which are screwed onto the end of the pivot 16a. To give a clear idea, the clearance permitted by said ring is of the order of a few hundredths of a millimeter.

The countercranked extremity of the plate 3 is held in position between, on the one hand, flat ball-bearing 28 and 29 placed between the top face of said plate and the bottom face of the portion 5 of the mechanism casing and, on the other hand, a flat ball-bearing 30 inserted between the bottom face of the plate 3 and a semi-circular support bracket 31.

The mechanism $D_2$ is similar to the mechanism $D_1$ but need not be provided with driving means. The mechanism $D_2$ comprises a similar motor 7b which is synchronized with the driving motor 7a of the mechanism $D_1$ (FIG. 1) and is set at the initial point in exactly the same position and with the same orientation as this latter.

To this end, it is possible to employ identical stepping motors supplied in parallel or synchronous motors in which identity of position-setting is controlled by devices of the "Selsyn" type, for example.

Furthermore, a thin circular plate of antimagnetic material such as bronze can be interposed between the top electromagnet and the slide-block and guide assembly. This plate performs the function of an effort-limiting device for a relative displacement of the slide-block and the guide, in spite of the attraction of the top electromagnet.

With respect to the shafts 9 which carry them, the drums 10 are designed to permit the maximum value of eccentricity or in other words of the radius of the maxium circular translational motion which can be imparted to an electrode with a deformation which remains acceptable for the result obtained; in practice, this radius hardly exceeds 5 millimeters.

Since the guide 15 is centered with respect to the corresponding shaft 9, a degree of eccentricity or displacement off-center between zero value and maximum value can be imposed on the pivot 16a by the slide-block 16 as this latter moves with respect to said guide 15.

When the slide-block and the guide are located in any predetermined position, the energization of the top electromagnet has the effect of locking the slide-block and the guide in position and of making these latter fast with the shaft 9.

The top face of the flat crank 3 is applied against the flat ball-bearings 28 and 29.

Assuming that the drums of the mechanisms $D_1$ and $D_2$ have been similarly oriented at the time of assembly, that the positions of the two slide-block and guide assemblies are identical and that the top electromagnets are energized, the flat crank 3 is endowed with a circular movement of translation. At each instant, the diameter of the circles described by a point of the crank can be measured by a comparator carried by a fixed support, the measuring head of which is applied against any given point of the crank 3 in any direction at right angles to the axis of feed motion.

It is worthy of note that, if the top electromagnet releases the guide and the slide-block and if the bottom electromagnet is energized, the slide-block and the guide no longer rotate but, since the springs 34 continuously thrust the slide-block against the internal wall of the drum 10 and said wall forms a cam, said slide-block will carry out within the guide a back-and-forth movement having an amplitude which has twice the value of the radius of eccentric displacement.

Since the shaft 9 rotates at a low speed, for example one revolution per minute, this observation is turned to useful account so that the variation in eccentric displacement can be accomplished by means of an assembly of the type shown diagrammatically to FIG. 4.

A reversing relay 37 serves to change-over the current delivered by the supply S to the windings 42 and 17 of the mechanisms $D_1$ and $D_2$.

During operation, the windings 42 are continuously supplied by deenergization of the relay 37. The two slide-blocks and the two guides are therefore made fast with the drums 10. Furthermore, the extremity 16b of each slide-block is in contact with a given point of the internal periphery of said drum.

The circuit 38 for the supply of the relay 37 comprises three push-buttons $39_1$, $39_2$, $39_3$. The first push-button controls the supply of current to the relay 37 for a very short time interval such as one-tenth of a second, for example; the second push-button controls the supply of current during a time interval which can be ten times longer, for example; these time intervals are determined by any suitable timing system such as an electronic bistable circuit, for example. The third push-button ($39_3$) ensures continuous supply of the relay 37 as long as the push-button is depressed.

When making use of a cylindrical eccentric cam, the law of back-and-forth motion is sinusoidal. Assuming by way of example that the maximum value of eccentricity is 3 millimeters and the time-duration of one half-rotation is 30 seconds, a reversal of energization of the electromagnets of one-tenth of a second will result in a variation of six-tenths of a degree in the relative angular position of the slide-block and of the drum. Over about two-thirds of the distance of travel of the cam, there will thus be a practically constant variation of three one-hundredths of a millimeter in the diameter of eccentric displacement.

Under the same conditions, the push-button $39_2$ will result in a variation of three-tenths of a millimeter.

Since the shaft 9 rotates continuously in the same direction, then starting from a given relative position of the slide-block and of the drum, actions produced on the push-buttons $39_1$ and $39_2$ always bring about either a decrease or an increase in the value of eccentricity until the direction of the variation is reversed when passing through one of the maximum of minimum values of eccentricity.

In practice, by reason of the fact that the variations in the value of eccentricity desired are always in the same direction (namely an increase in the case of an electrode which is used for machining a cavity), it is necessary to set the slide-block initially in position in such a manner as to ensure that the relative rotation of the slide-block and of the drum is such that the action on the push-buttons $39_1$ and $39_2$ corresponds to an increase in eccentricity.

In the case of faulty position-setting, the push-button $39_3$ which permits relative rotation for a selected period of time serves to pass the slide-block on the other side of the diameter of the drum 10 along the axis 9 or in other words to change the direction of variation. Visual or electrical reference marks can facilitate this variation in position-setting.

It is possible at the cost of more complex machining of the drum 10 to obtain a law of linear variation of the back-and-forth movement as a function of the movement of rotation of said drum.

To this end and as shown in FIG. 6, the eccentric cam constitued by the internal wall of the drum has the shape of two symmetrical portions of Archimedean spiral 41a, 41b (linear increase of the radius vector with the variation in polar angle).

The internal boss 52 of a cam of this type can be dispensed with and replaced by a flat portion 53 forming a junction between the two portions of a spiral.

Whether the mechanism $D_2$ is provided with a motor 7b or not, it is only necessary to carry out accurate adjustment of the distance $e_1$ between the axes $9_1$ and $16a_1$ (as shown in FIG. 5) respectively of the shaft 9 and of the pivot 16a within the mechanism $D_1$ in order to ensure that the distance between the corresponding axes $9_2$ and $16a_2$ of the mechanism $D_2$ is adjusted to the same value.

In fact, the distance between the axes $9_1$ and $9_2$ which are fixed in space is constant and determined by the frame 4. The distance between the axes $16a_1$ and $16a_2$ which rotate about the axes just mentioned is also constant and equal to the preceding. This distance is defined by the crank 3. Since a certain sliding motion in conjunction with an effort-limiting action is possible within the mechanism $D_2$ by virtue of the antimagnetic plate interposed within said mechanism between on the one hand the top electromagnet and on the other hand the guide and the slide-block each time the four axes pass through the state of alignment, the distance $e_2$ is caused to be equal to the distance $e_1$. The radii of the two circles $40_1$ and $40_2$ are therefore necessarily equal and the movement of the crank 3 is in fact a movement of circular translation.

Referring now to FIG. 7, an alternative embodiment of the invention will be described.

A workpiece E is rigidly secured to a supporting table F which acts as a coupling crank by linking driven parts 16a to each other. Said driven parts are parts of respective mechanisms $G_1$, $G_2$ which comprise means to impart to parts 16a an orbital movement. Rotative motors 7a are provided to energize said mechanisms.

The frames of the mechanisms $G_1$, $G_2$ are rigidly secured to intermediate housings H which are in turn rigidly secured to respective supporting pillars J, so that said frames are parts of the supporting means of the machine.

The table F rests upon the frames by means of lower ball-bearings 28, 29 and is maintained by brackets 31 which are provided with upper ball bearings 30.

In operation, the table F is moved along a circular translational motion by the driven parts 16a and moves consequently the workpiece E secured thereto, while the electrode (not shown) remains laterally stationary and is only submitted to a feed motion towards the workpiece E, thereby the relative movement aforementiond is obtained.

Alternative embodiment could be made, comprising four mechanisms so located as to form a rectangle corresponding to the table F. At least one of said four mechanisms should be provided with a motor.

The invention applies to equipment for machining by electro-erosion in order to perfect the work performed by the machining electrodes.

We claim:

1. A reaming device for an electro-erosion machine, said machine comprising a machining head to control the advance of an electrode by means of a spindle toward a workpiece, said device having means to impart, in planes perpendicular to the direction of said advance, a reciprocal orbital movement according to a lateral circular translational motion of adjustable radius of curvature to two respective members relative to each other, one of said members being moved and the other remaining laterally stationary, said two members comprising a support member of the electrode and a support member of the workpiece, said device comprising at least two mechanisms which are synchronous and have the same orientation, one of them at least being moved by a motor, each of said mechanisms comprising a frame rigidly secured to said stationary support member and an eccentric pivot rotatably mounted in a bearing of said moving support member so as to form therewith a crank-rod assembly, the crank arm length of all those mechanisms being the same, each of said mechanisms being further provided with respective control means responsive to a common signal of pulses transmitted and applied by electromagnetic means to synchronously vary said crank arm length, thereby to adjust the radius of curvature without having to stop the machine.

2. A device according to claim 1, each of said mechanisms comprising a shaft mounted in a bearing on said frame and fixed to a drum having an internal wall whichforms a cam, said shaft being further mounted within a bearing of a radial guide located inside the drum and adapted to cooperate with a slide block carrying said eccentric pivot which is parallel to said shaft, said slide-block being urged towards said cam by elastic means applied to the guide, said control means comprising a first and a second electromagnet adapted to be energized alternatively, said fist electromagnet being further adapted to simultaneously couple said slide-block and said guide to said drum, and said second electromagnet being adapted to couple said guide to said frame, said slide-block being provided with an antifriction and antimagnetic lining, whereby said slide-block slides within said guide and cooperates with said cam.

3. A device according to claim 1, said member which is moved being the support member of the electrode and the workpiece to be machined remaining stationary, said electrode being rigidly secured to said moving support member by means of a coupling flange, and said frames of said mechanisms being rigidly secured to the spindle of the machining head by means of a similar coupling flange.

4. A device according to claim 1, said member which is moved being the support member of the workpiece to be machined, the electrode being subject only to a feed motion toward the workpiece, said frames of said mechanisms being part of a supporting means of the machine.

* * * * *